(12) United States Patent
Haworth et al.

(10) Patent No.: US 10,902,108 B2
(45) Date of Patent: *Jan. 26, 2021

(54) SYSTEMS AND METHODS FOR LOCATION-BASED AUTOMATED AUTHENTICATION

(71) Applicant: UScontracting, Inc., Odenton, MD (US)

(72) Inventors: William Frederick Haworth, Sherwood Forest, MD (US); Kevin Austin Maynard, Annapolis, MD (US); Jeffrey Brader Kidwell, Stevensville, MD (US)

(73) Assignee: USCONTRACTING, INC., Odenton, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/682,592

(22) Filed: Nov. 13, 2019

(65) Prior Publication Data

US 2020/0151983 A1 May 14, 2020

Related U.S. Application Data

(63) Continuation of application No. 15/921,197, filed on Mar. 14, 2018, now Pat. No. 10,482,692, which is a
(Continued)

(51) Int. Cl.
*G06Q 20/38* (2012.01)
*G06Q 20/32* (2012.01)
(Continued)

(52) U.S. Cl.
CPC ......... *G06F 21/35* (2013.01); *G07C 9/00309* (2013.01); *G07C 9/21* (2020.01);
(Continued)

(58) Field of Classification Search
CPC .... G06Q 30/02; G06Q 20/3224; G06Q 30/00; G06Q 30/0201; G06Q 30/0207;
(Continued)

(56) References Cited

U.S. PATENT DOCUMENTS 9,922,473 B1 * 3/2018 Haworth .............. G06Q 20/401
10,482,692 B2 * 11/2019 Haworth ................. G07C 9/21
(Continued)

OTHER PUBLICATIONS

Haworth, International Application PCT, App. No. PCT/US18/12947, International Application PCT Patent Application; Entire Document.
(Continued)

*Primary Examiner* — Dionne Pendleton
(74) *Attorney, Agent, or Firm* — NEO IP

(57) ABSTRACT

Systems and methods for location-based automated authentication are disclosed. A system comprises a mobile device, a sensor and a backend platform. The sensor and the backend platform are in network communication. The mobile device is operable to continuously transmit Bluetooth Low Energy (BLE) signals comprising encrypted transitory identifiers. The sensor is operable to receive a BLE signal from the mobile device when the mobile device is within a predetermined range, and communicate over a network connection the encrypted transitory identifier comprised in the BLE signal to the backend platform. The backend platform is operable to extract a unique identifier and a changing encrypted identifier from the received encrypted transitory identifier, generate a changing encrypted identifier, and validate a user identification by comparing the generated changing encrypted identifier and the extracted changing encrypted identifier.

20 Claims, 4 Drawing Sheets

Related U.S. Application Data continuation-in-part of application No. PCT/US2018/012947, filed on Jan. 9, 2018, which is a continuation-in-part of application No. 15/412,321, filed on Jan. 23, 2017, now Pat. No. 9,922,473, said application No. 15/921,197 is a continuation-in-part of application No. 15/412,321, filed on Jan. 23, 2017, now Pat. No. 9,922,473.

(51) Int. Cl.
| | |
|---|---|
| *G06F 21/35* | (2013.01) |
| *H04L 29/06* | (2006.01) |
| *G07C 9/00* | (2020.01) |
| *H04W 4/02* | (2018.01) |
| *H04W 4/80* | (2018.01) |
| *H04W 12/00* | (2009.01) |
| *G07C 9/21* | (2020.01) |
| *G07C 9/27* | (2020.01) |
| *G07C 9/28* | (2020.01) |
| *G07C 9/20* | (2020.01) |
| *H04W 12/04* | (2009.01) |
| *H04W 12/06* | (2009.01) |
| *G07B 15/06* | (2011.01) |
| *H04W 4/48* | (2018.01) |

(52) U.S. Cl.
CPC .............. *G07C 9/215* (2020.01); *G07C 9/27* (2020.01); *G07C 9/28* (2020.01); *H04L 63/0428* (2013.01); *H04L 63/0861* (2013.01); *H04W 4/02* (2013.01); *H04W 4/80* (2018.02); *H04W 12/001* (2019.01); *H04W 12/00514* (2019.01); *H04W 12/0403* (2019.01); *H04W 12/0609* (2019.01); *G06F 2221/2111* (2013.01); *G07B 15/063* (2013.01); *G07C 2009/00317* (2013.01); *G07C 2009/00412* (2013.01); *G07C 2009/00769* (2013.01); *H04L 2463/121* (2013.01); *H04W 4/48* (2018.02); *H04W 12/00502* (2019.01)

(58) Field of Classification Search
CPC .............. G06Q 30/0261; G06Q 20/00; G06Q 30/0209; G06Q 30/0212; G06Q 30/0255; G06Q 30/0267; G06Q 30/0269; G06Q 50/34; G06Q 20/401; G06Q 20/202; G06Q 20/325; G06Q 20/327; G06Q 20/363; G06Q 20/38215; G06Q 20/3829; G06Q 2220/00; H04L 67/18; H04L 43/10; H04L 2209/76; H04L 2209/805; H04L 63/0414; H04L 63/0846; H04L 67/306; H04L 9/0637; H04L 9/0825; H04L 9/28; H04L 9/3228; H04L 2463/121; H04L 63/0428; H04L 63/0823; H04L 63/0492; H04L 63/0861; H04L 67/20; G01S 1/02; G01S 1/70; G01S 1/72; G01S 5/0018; H04H 60/90; H04H 20/61; H04H 20/62; H04H 60/51; H04H 60/63; H04H 60/91; H04M 3/42178; H04W 4/008; H04W 4/06; H04W 12/02; H04W 84/18; H04W 12/04; H04W 4/025; H04W 64/00; H04W 12/08; H04W 4/023; H04W 12/06; H04W 48/10; H04W 4/001; H04W 4/02; H04W 4/028; H04W 8/205; H04W 4/48; H04W 4/80; H04W 12/0017; H04W 12/00502; H04W 12/00518; H04W 12/12; H04W 12/0608; H04W 4/029; H04W 92/045; H04W 92/10; G07B 15/063; G07C 2009/00317; G07C 2009/00412; G07C 2009/00769; G07C 9/00015; G07C 9/00023; G07C 9/00103; G07C 9/00309; G07C 9/21; G07C 9/215; G07C 9/27; G07F 17/3223; G07F 17/3227; G06F 21/35; G06F 21/44; G06F 2221/2151

See application file for complete search history.

(56) References Cited

U.S. PATENT DOCUMENTS

| | | | |
|---|---|---|---|
| 2008/0127353 A1* | 5/2008 | Rusman | G11B 20/00739 726/27 |
| 2008/0258870 A1 | 10/2008 | Sugiura | |
| 2010/0201536 A1 | 8/2010 | Robertson et al. | |
| 2013/0217332 A1 | 8/2013 | Altman et al. | |
| 2013/0257589 A1 | 10/2013 | Mohiuddin et al. | |
| 2014/0220883 A1 | 8/2014 | Emigh et al. | |
| 2014/0375421 A1 | 12/2014 | Morrison et al. | |
| 2016/0055693 A1 | 2/2016 | Somani et al. | |
| 2016/0337508 A1 | 11/2016 | Roy et al. | |
| 2018/0211457 A1 | 7/2018 | Haworth et al. | |

OTHER PUBLICATIONS

Haworth, U.S. Appl. No. 15/412,321, Non-Provisional Patent Application; Entire Document.

\* cited by examiner

SYSTEMS AND METHODS FOR LOCATION-BASED AUTOMATED AUTHENTICATION

CROSS REFERENCES TO RELATED APPLICATIONS

This application relates to and claims priority from the following applications: This application is a continuation of U.S. application Ser. No. 15/921,197, filed Mar. 14, 2018, which is a continuation-in-part of U.S. application Ser. No. 15/412,321, filed Jan. 23, 2017. U.S. application Ser. No. 15/921,197 is also a continuation of International Application No. PCT/US18/12947, filed Jan. 9, 2018, which claims priority to and is a continuation-in-part of U.S. application Ser. No. 15/412,321, filed Jan. 23, 2017, now U.S. Pat. No. 9,922,473. Each of these applications is incorporated herein by reference in its entirety.

BACKGROUND OF THE INVENTION

1. Field of the Invention

The invention relates to location-based automated authentication.

2. Description of the Prior Art

Personal mobile devices, especially smart phones, become so popular that almost everyone has one with them wherever they are. Modern communication technologies and various mobile applications have equipped smart phones with a variety of functions besides basic calling and texting. As one example, mobile devices are used for access authentication and validation.

By way of example the following are relevant prior art documents relating to access authentication and validation:

U.S. Patent Publication No. 20100201536 for "System and method for accessing a structure using a mobile device" by inventor William Benjamin Robertson et al., filed Feb. 10, 2009, describes a wireless device access system employs short-range wireless communication to detect the proximity of a user device to a structure and a wide-area data network to communicate an unlock request. The access system then authenticates the unlock request and the proximity of the user device prior to transmitting an unlock command to the structure. Additionally, the wireless device may require the proximity of a user token prior to operation and/or the access system may include an override within the structure blocking any unlock command. Besides providing access to the structure, the system may perform other functions, such as monitoring room occupancy, switching power on and off, and the like.

U.S. Patent Publication No. 20130257589 for "Access control using an electronic lock employing short range communication with mobile device" by inventor Mohammad Mohiuddin et al., filed Mar. 1, 2013, describes systems and methods for obtaining access to an area or an object secured by an electronic locking device. The methods involve: obtaining, by a Mobile Communication Device ("MCD"), a unique identifier associated with the Electronic Locking Device ("ELD") via a first Short Range Communication ("SRC"); communicating the unique identifier from MCD to a Remote Communication Device ("RCD") via a network connection; receiving at least one symbol associated with the unique identifier that facilitates unlocking of ELD from RCD via the network connection; and causing ELD to be unlocked by communicating a key from MCD to ELD via a second SRC.

U.S. Patent Publication No. 20140220883 for "Presence Detection Using Bluetooth and Hybrid-Mode Transmitters" by inventor Aaron T. Emigh et al., filed Feb. 4, 2014, describes presence detection using Bluetooth and hybrid-mode transmitters. In some embodiments, one or more transmitters are configured to transmit an iBeacon broadcast and a proprietary Bluetooth Low Energy (BTLE) broadcast, wherein at least one of the transmitted broadcasts includes an identifier that specifies a venue. The broadcasts are captured by a handset and decoded to infer presence of the handset at the venue.

U.S. Patent Publication No. 20140375421 for "Systems and methods for enabling access control via mobile devices" by inventor John David Morrison et al., filed Jun. 18, 2014, describes systems and methods for enabling access control via mobile devices. Embodiments of the invention have been particularly developed for allowing a user to gain access to a controlled functionality (for example the unlocking of a door) using a smartphone or the like. These leverage short-range wireless communications, such as Bluetooth Low Energy or Near Field Communications.

U.S. Patent Publication No. 20160055693 for "Validation in secure short-distance-based communication and enforcement system according to visual objects" by inventor Avishek Somani et al., filed Jun. 18, 2015, describes a secure short-distance-based communication and enforcement system validates users in a validation and enforcement area and can check if users in the validation and enforcement area have been validated. A visual object can be displayed on an enforcement computer and a mobile device of a user in the in the validation and enforcement area to determine if a user is validated. The visual object may be periodically changed.

SUMMARY OF THE INVENTION

Systems and methods for location-based automated authentication are disclosed. A system comprises a mobile device, a sensor and a backend platform. The sensor and the backend platform are in network communication. The mobile device is operable to continuously transmit Bluetooth Low Energy (BLE) signals comprising encrypted transitory identifiers. The sensor is operable to receive a BLE signal from the mobile device when the mobile device is within a predetermined range, and transmit an encrypted transitory identifier comprised in the BLE signal to the backend platform. The backend platform is operable to extract a unique identifier and a changing encrypted identifier from the received encrypted transitory identifier, generate a changing encrypted identifier, and validate a user identification by comparing the generated changing encrypted identifier and the extracted encrypted transitory identifier. An associated mobile application is installed on the mobile device. The associated mobile application is activated and send user identification parameters to the backend platform. The mobile application and the backend platform use the same algorithm to generate changing encrypted identifiers.

These and other aspects of the present invention will become apparent to those skilled in the art after a reading of the following description of the preferred embodiment when considered with the drawings, as they support the claimed invention.

DETAILED DESCRIPTION

Figure 1:
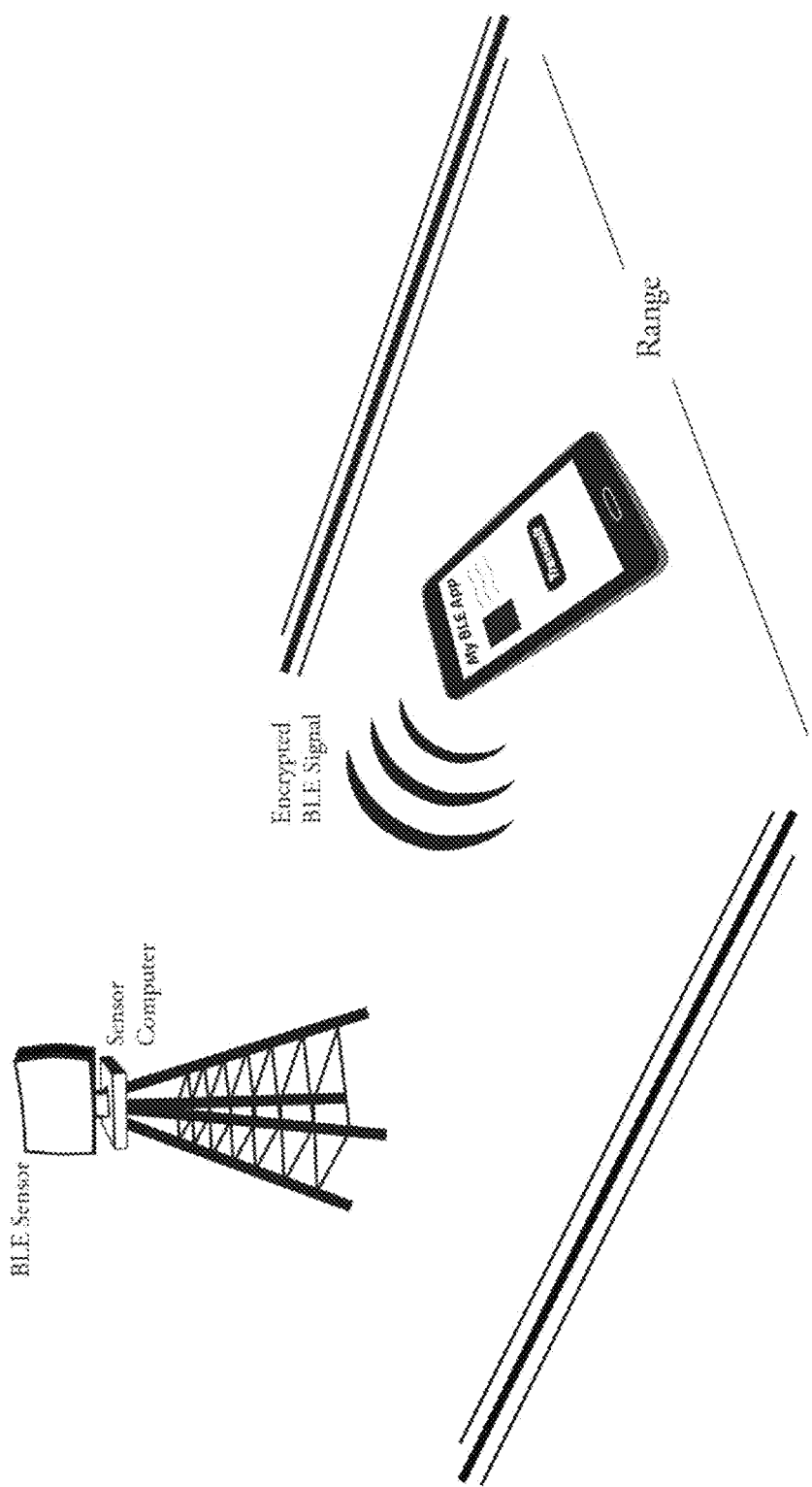
FIG. 1 is a diagram of BLE transmission and range in one embodiment of the present invention.

The present invention provides systems and methods for identifying and authenticating mobile devices in designated locations. A mobile device downloads and activates a mobile application ("app"), and provides identification information to be stored in the BAS. The mobile device then transmits Bluetooth Low Energy (BLE) signals containing encrypted identification information. A sensor receives the BLE signals when the mobile device is within range and communicates to a Backend Account System (BAS). The BAS validates and authenticates the user identification, corresponding functions and actions are executed, and a response is sent to the sensor. The mobile device receives the response from the backend system at a later point regarding the execution of the functions and/or actions. Additionally, the mobile device user can query for the history of transactions at any time.

The present invention is a Location-Based Automated Authentication System (LBAAS). The LBAAS involves a secure platform for identifying specific users in designated geographic locations. In the present invention, an Encrypted Transitory Identifier (ETID) is transmitted via a BLE signal from a mobile device through a BLE sensor and into the BAS system; and the ETID is resolved at the BAS system into a Unique Identifier (UID) and Changing Encrypted Identifier (CEID) that are used to recognize and authenticate a user.

The ETID is a dynamic and temporary transmission from a user's mobile device. The Back-end Account System (BAS) uses a function in the form of $f_x(ETID)=UID+CEID$ to decode and translate a valid ETID into a static UID associated with a user and a CEID.

The entire LBAAS consists of three major components: a mobile application that broadcasts using BLE, a sensor, and a BAS. These components and their functions are described below in Table 1.

antenna. The sensor is in a ready state to collect input from an application running on a mobile device within its immediate vicinity. The mobile application is designed for devices that have Bluetooth 4.0, capable of emitting BLE signals. The BAS runs on a remote set of Linux based computers with sufficient capacity to handle many concurrent lookups from multiple sensors. In one embodiment, the BAS is configured for a specific application, such as a toll gate scenario, on a platform tailored to system requirements. This can be one or more computers or on a cloud-based platform, which is able to host many different BAS systems for different applications.

All mobile devices are first registered in the BAS in order to identify and authenticate users. A user downloads and activates a mobile application to a mobile device, and provides identification information to be stored in the BAS. This identification information is used to create a UID as an index for the user. A Changing Time Interval (CTI) for the system is also saved to a user's account along with other account parameters and data to act as a seed in the creation of CEIDs on both the mobile device and the BAS.

Figure 2:
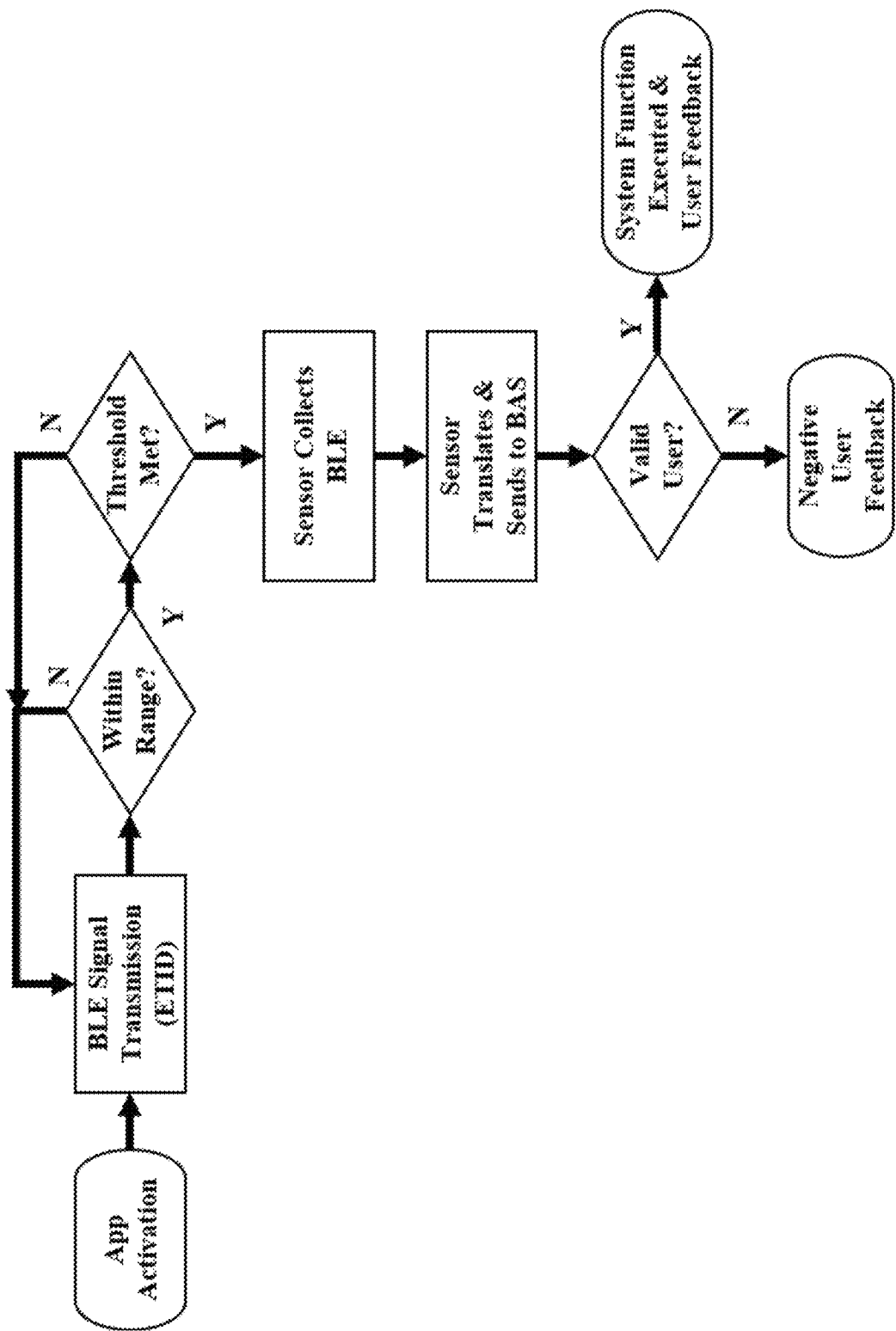
FIG. 2 is a flowchart of the automated authentication process in one embodiment of the present invention.

FIG. 1 is a diagram of BLE transmission and range in one embodiment of the present invention. During a normal operation, the mobile application generates and transmits an ETID via BLE, and a sensor recognizes and reads BLE signals along with their corresponding signal strengths. The mobile device is within the detection rage of the sensor when a signal strength threshold is met. The sensor receives the emitted BLE signal, decodes the ETID, and passes it to the BAS for confirmation of a valid user. The BAS extracts a UID and CEID from the ETID, validate the user's identity, returns a response depending on the application to the sensor, and then performs other specific system functions and operations, e.g., billing, e-mail, text notifications to the originating mobile device, or generating system logs. If it is a valid user, a corresponding system function (e.g., raising a gate or activating a light) is executed and the response provides positive user feedback. If it is not a valid user, the response provides negative user feedback. FIG. 2 illustrates the Automated Authentication Process in one embodiment of the present invention. Feedback for unauthorized users on their mobile devices is limited based on whether they have active accounts in the BAS.

TABLE 1

System Component Descriptions & Functions

| Component | Composition | Function |
| --- | --- | --- |
| Mobile Application | A software program running on a mobile device | Transmits ETID via BLE when activated by user |
| A sensor | A computer with an attached antenna capable of receiving BLE signals, strategically placed and calibrated based on system functions and requirements | Receives the BLE signals, decodes EITD, and communicates with the BAS |
| Back end Account System (BAS) | A remote computer and data store | Stores user information needed by the system to perform its function; generates and stores a UID; resolves and validates the CEID from mobile device |

Figure 3:
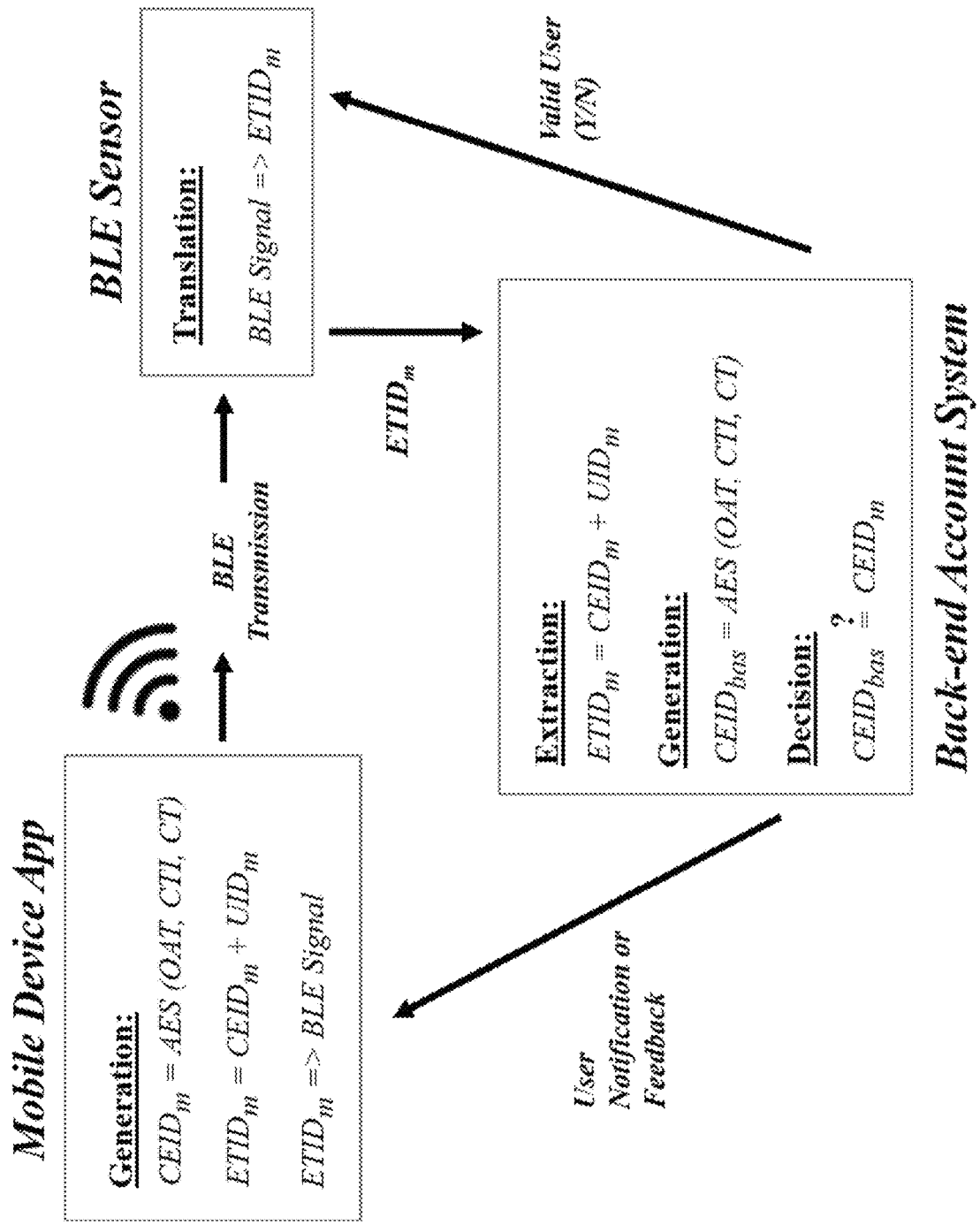
FIG. 3 is a diagram of architecture data flow for the authentication process in one embodiment of the present invention.

In one embodiment, the sensor consists of a Linux based computer with an attached 2.4 GHz high-gain directional FIG. 3 illustrates a data flow architecture for user authentication.

When a user first downloads and opens the mobile application, they provide information to populate the BAS. There are a few other key parameters automatically collected or generated including a Changing Time Interval (CTI), an Original Account Timestamp (OAT), a Unique ID (UID), and Unique Encryption Key. These parameters are stored in both the BAS and the non-volatile memory of the mobile device; and are required to identify and authorize the particular mobile device in real time.

Once all the necessary parameters are created and stored, the authentication process begins when a user turns on the application and BLE signals are emitted from the mobile device. Preferably, a user verification step, for example, a pin, a fingerprint, or a voice password, is needed for turning on the mobile application for security purposes. For example, an application may require the use of verification for a limited time to prevent unauthorized use of the mobile device. The content of the BLE signal is generated from a series of proprietary steps that effectively provide a unique secure algorithm that runs in the background of the application. The OAT, CTI, and the Current Timestamp (CT) is used to calculate a value for user authentication. This value is then encrypted with an Advanced Encryption Standard (AES) algorithm using the Unique Encryption Key. The result is reduced into a usable size and known as the CEID. The CEID is then combined with the UID to create the ETID that is packaged and transmitted in a unique BLE signal. The present invention provides secure user identification transmission over BLE signals, because the CEIDs in the BLE signals change over time based on the algorithm used to create the CEIDs. This way, the BLE signals cannot be emulated, copied or replayed.

A calibrated BLE sensor reads BLE signals that are within range and translates the BLE signals from the mobile device into the ETID. The sensor then connects to the BAS to transfer the ETID.

The BAS extracts the UID from the ETID. The UID is used to look up the specific user parameters. The BAS performs the same algorithm as that of the mobile device, and generates a CEID using the CTI, the OAT, the CT, and the Unique Encryption Key. The BAS then compares the extracted CEID (from the ETID sent by the sensor) with the generated CEID to validate the user.

If the CEIDs match, the functions and/or actions of the system are carried out (e.g., flash an indicator or open a gate, and charging an account). If the values do not match, no further functions or actions are necessary. In either case, the BAS sends the successful or failed response back to the sensor so it may complete the transaction at the point of BLE reception.

The system in the present invention transforms an insecure open-source BLE format into a secure proprietary solution for automated transactions by the use of encryption, synchronous clocks, and highly sophisticated algorithms. With the unique security solution, the system is able to identify and authenticate users while preventing replay attacks. It is virtually impossible for someone to eavesdrop on someone else's BLE signal and retransmit the same signal.

Many mobile applications use BLE technology to scan for signals that trigger some other action. Typically, the mobile device is used as a scanner and not as a broadcaster. However, the present invention reverses the direction of the data flow. Instead of receiving signals, the mobile device in the present invention is broadcasting signals in the background of the phone with virtually no battery consumption. By reversing the data direction and using BLE, the architecture in the present invention has a relatively low impact on mobile device battery levels. BLE can be active for days without any substantial drain on battery resources. Mobile devices, for example mobile devices equipped with Bluetooth 4.0, Bluetooth 5.0 and later Bluetooth versions, are operable to transmit small amounts of data periodically with very low power consumption using BLE functionality. In one embodiment of the present invention, BLE mobile devices broadcast ETIDs via BLE signals on the 2.4 GHZ bandwidth.

The BLE functionality works in two different modes, namely connected mode and advertising mode, which are utilized for different purposes. BLE mobile devices in the present invention preferably never operate in connected mode, and therefore never establish a communication connection with any other BLE devices. Never establishing a communication connection with any other BLE devices significantly reduces battery power consumption of the mobile device. In the present invention, BLE mobile devices transmit ETIDs in advertising mode. In one embodiment, a user is enabled to turn a BLE mobile device to a driving mode or standby mode so as to turn on or off the BLE advertising mode for ETID broadcasting. For example, a user gets into his/her car and turns his/her BLE mobile device to driving mode, and his/her mobile device starts emitting BLE signals including ETIDs. Once the user reaches his/her destination, he/she turns his/her BLE mobile device to standby mode, preferably by exiting driving mode, and the BLE mobile device stops transmitting BLE signals. In another embodiment, BLE mobile devices are operable to detect if the BLE mobile devices are in motion or stationary based on location services and related technologies. When a BLE mobile device detects itself in motion, the advertising mode is triggered and the mobile device starts transmitting BLE signals including ETIDs. In one embodiment, a threshold for motion is a certain speed, such as 10 miles per hour (mph), 15 mph, 20 mph, 25 mph, 30 mph, 35 mph, 40 mph, 45 mph, 50 mph, 55 mph, 60 mph, or 65 mph. Advertising mode is activated upon the threshold for motion being reached, and remains activated while the speed is above the defined threshold. Additionally, advertising mode remains activated for a period of time following a drop in the measured speed below the defined threshold, such as 5 minutes, 10 minutes, 15 minutes, 30 minutes, 1 hour, or 2 hours after dropping below the defined threshold. This advantageously accounts for variations in traffic, such as traffic jams. When the BLE mobile device detects itself stationary for a predetermined time period, it stops transmitting BLE signals. In another alternative, the mobile device is operable to recognize that it is within a predetermined proximity of a vehicle or within the vehicle by receiving a BLE signal from the vehicle or any other method known in the art for a mobile device to recognize a presence of a vehicle and/or for a vehicle to recognize a presence of a mobile device, and the advertising mode is triggered so that the mobile device starts transmitting BLE signals including ETIDs.

The BLE functionality typically has four configurable frequency settings that affect ETID transmission rates. The actual frequency changes at the operating system level due to CPU activity of a device. If the CPU of a BLE mobile device is busy at the time the BLE mobile device is set in driving mode, the BLE mobile device transmits BLE signals slightly less frequently than when the CPU is idle. In one embodiment, the present invention utilizes the highest frequency setting for BLE transmissions to maintain reliability. The higher the frequency, the more BLE signals a BLE sensor collects while a BLE mobile device is within a certain distance of the BLE sensor. A high frequency setting is particularly important for BLE mobile devices in vehicles traveling at high speeds. For example, a vehicle traveling at 100 mph is only within the scanning range of a BLE sensor for a very brief time period. Higher BLE transmission frequency enables the BLE sensor to pick up more BLE signals as the vehicle travels at high speeds past the BLE sensor. In one embodiment, the BLE signal transmission frequency increases with the speed of a vehicle, with the speed being determined via a Global Positioning System (GPS) or any other technology for determining speed in real-time or near real-time. A lower BLE transmission frequency potentially causes a BLE sensor to miss BLE signals from a BLE mobile device as it passes at a high speed. Higher BLE transmission frequency provides lower latency and better reliability but with more battery consumption. In one embodiment, the BLE transmission frequency is set at 10 Hz, and the ETID transmission rate is about 10 Hz or 10 ETIDs per second. Frequency deviations are about 1-3 Hz due to CPU activities of a BLE mobile device when BLE signals transmitted from the BLE mobile device are received by a BLE sensor. Thus, in one example, a BLE transmission frequency is between about 7 Hz and about 13 Hz, or alternatively between about 9 Hz and about 11 Hz.

In the present invention, there is no initiation by the mobile device for communication with a computer system in order to exchange messages for authentication, and there is no connection needed between the mobile device and the BAS to complete a transaction. The mobile device merely emits BLE signals comprising ETIDs generated from CEIDs. Once the sensor receives the BLE signals, the authentication process is done between the sensor and the BAS.

The unique broadcasting feature also enables the application to perform with very little network connection. A network is only needed during registration to connect the mobile device to the BAS. Once this information is recorded, the Automated Authentication Process is performed without network connection between the mobile device and the BAS. The receiving device is a stationary sensor which can be attached to a constant power source and handle all networking requirements. In other words, the mobile device merely emits BLE signals and the identification and authentication are performed on the sensor and the BAS.

The mobile device application and the BAS are highly customizable. The area within which a sensor will detect a BLE signal and the signal strength required to trigger the user authentication can be adjusted to meet requirements of different applications and/or tasks. Sensors can also be placed in a variety of different locations. Possible applications include: tolls, gates, entrances, garages, boat lifts, ski lifts, etc.

The present invention is applicable to places where Radio Frequency Identification (RFID) or Near Field Communication (NFC) technologies are used for identification authentication and validation. The encrypted BLE transmission by mobile devices in the present invention provides a comparably secure and more convenient mechanism for user identification. The use of both one-way identification and processing application on a single user device makes this a more convenient platform for user validation.

Use Case 1: Toll Collection

Figure 4:
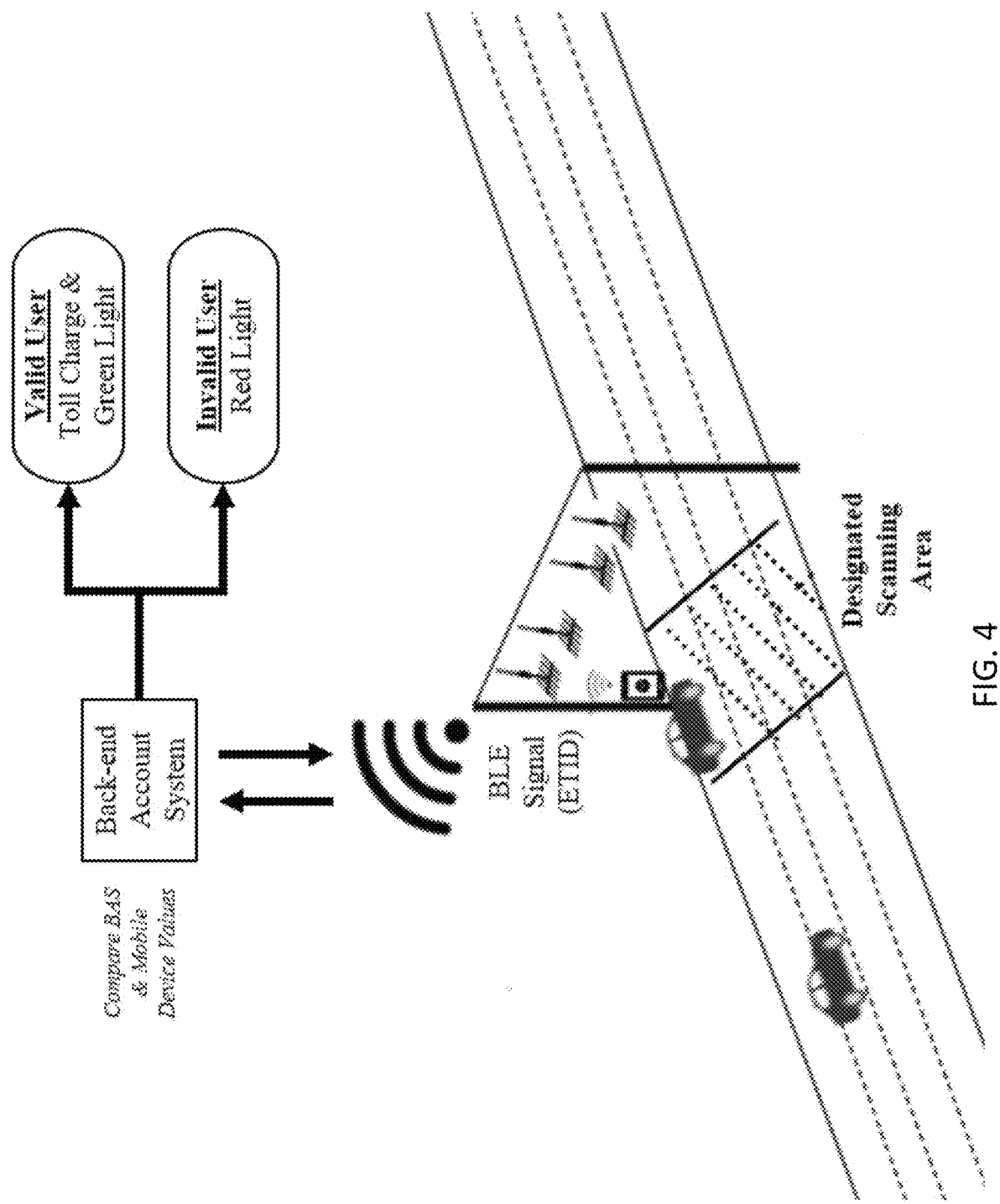
FIG. 4 is an illustration of a toll lane use case in one embodiment of the present invention.

In one embodiment, the use of BLE enables a secure low energy solution for toll collection systems as shown in FIG. 4.

During a preliminary phase, BAS data requirements are defined and then the BAS is set up with a network connection; sensors are installed, calibrated, and connected to given toll locations; and users download an app to their mobile devices and enter all required account information. Changing Time Interval, Original Timestamp, UID, Unique Encryption Key are automatically generated and saved to the user system account. Users provide credit card or bank information, billing addresses, valid vehicle plate numbers, and other personal information.

During an execution phase, a user gets in the car and turns on the application on his mobile device. The application generates a CEID using a secure algorithm and combines the CEID with the user's UID to create an ETID. The ETID is packaged and broadcast via a BLE signal. The BLE signal is continuous, but the ETID being broadcast changes based on the defined Changing Time Interval. As the car approaches the toll booth, the toll booth sensor starts to receive the BLE transmission. The mobile device is within range when a predetermined signal strength threshold is met. The toll booth sensor reads the BLE signal and translates it into the ETID. The toll booth sensor connects to the BAS and sends the ETID. The BAS receives the ETID and separates it into the UID and CEID. The BAS looks up the user system account using the UID separated from the received ETID. The parameters saved to the user system account within the BAS, including Changing Time Interval, Original Timestamp, UID, and Unique Encryption Key, are used to synthesize a CEID with the same algorithm used by the mobile device application. The BAS compares the synthesized CEID to the one received from the mobile device (via BLE and the toll booth sensor). If the CEIDs match, a license plate photo is taken for secondary verification; the user credit card or bank account is charged; a log or invoice is generated and sent to the user's mobile applications; and the light on the toll booth turns green. If the CEIDs do not match, a license plate photo could be taken for secondary verification or ticketing. For further integration, if the plate photo is verified and the account is charged, a log is generated and sent to the application to notify the user that the account was successfully charged, and the light on the toll booth turns green. If the plate photo is not verified, the light on the toll booth turns red.

Use Case 2: Gated Entrance Admission

In one embodiment, the present invention is used for admitting to gated facilities, for example, a gated neighborhood, a garage, an entrance to a factory or other facilities, etc. A BAS is set up with specific data requirements for gated entrance admission. A gate sensor at the gated entrance is installed, calibrated and connected to the BAS in network communication. Authorized users download an app to their mobile devices and enter all required information. For example, authorized license plate numbers, authorized user names, work identifications, phone numbers, and other personal information for people who are authorized to enter a gated facility. Changing Time Interval, Original Timestamp, UID, Unique Encryption Key are automatically generated and saved to corresponding user system accounts.

A user turns on the app on his mobile device. The app generates a CEID using a secure algorithm and combines the CEID with the user's UID to generate an ETID. The ETID is packaged and broadcast via a BLE signal. The BLE signal is continuous, but the ETID changes based on the defined Changing Time Interval. As the user approaches the gated entrance, the gate sensor starts to receive the BLE transmission. The mobile device is within range when a predetermined signal strength threshold is met. The gate sensor reads the BLE signal and translates it into the ETID. The gate sensor then sends the ETID to the BAS. The BAS receives the ETID and separates it into the UID and CEID. The BAS looks up the user system account using the UID separated from the received ETID. The parameters saved to the user system account within the BAS, including Changing Time Interval, Original Timestamp, UID, and Unique Encryption Key, are used to synthesize a CEID with the same algorithm used by the mobile device application. The BAS compares the synthesized CEID to the one received from the mobile device (via BLE and the gate sensor). If the CEIDs match, a gate light turns green and the gate is open for the user automatically; and the user may receive a notification on the mobile device regarding the admission at a later time. If the CEIDs do not match, the gate light turns red and the gate keeps closed, and the user receives a notification for denial.

Use Case 3: Employee Access

In one embodiment, the present invention is used for employee access authentication. For example, in a large company campus, there are different departments, usually employees are only authorized to enter the department they work at and public space, only certain employees such as high-level management personnel can access to multiple departments. For example, only laboratory staff and executives are allowed to enter a certain laboratory. A BAS is set up with specific data requirements for the laboratory entrance. A sensor at the entrance is installed, calibrated and connected to the BAS in network communication. Authorized employees download a mobile app to their mobile devices and enter all required information. For example, work identifications, employee names, phone numbers, and other employment related data for employees who are authorized to enter the laboratory. Changing Time Interval, Original Timestamp, UID, Unique Encryption Key are automatically generated and saved to the corresponding employee system accounts on both the mobile app and the BAS.

An employee turns on the app on his mobile device. At this point, the application may request a fingerprint scan to verify user identity. The fingerprint can be sent to the BAS to verify the user identity for a defined short interval. This activity will essentially authenticate the holder of the device as the individual authorized for entrance. The app generates a CEID using a secure algorithm and combines the CEID with the employee's UID to generate an ETID. The ETID is packaged and broadcast via a BLE signal. The BLE signal is continuous, but the ETID changes based on the defined Changing Time Interval. As the employee approaches the entrance to the laboratory, the sensor at the entrance of the laboratory starts to receive the BLE transmission. The mobile device is with range when a predetermined signal strength threshold is met. The sensor reads the BLE signal and translates it into the ETID. The sensor then sends the ETID to the BAS. The BAS receives the ETID and separates it into the UID and CEID. The BAS looks up the employee system account using the UID separated from the received ETID. The parameters saved to the employee system account within the BAS, including Changing Time Interval, Original Timestamp, UID, and Unique Encryption Key, are used to synthesize a CEID with the same algorithm used by the mobile app. The BAS compares the synthesized CEID to the one received from the mobile device (via BLE and the sensor). If the CEIDs match, the entrance is unlocked and open for the employee automatically; and the employee receives a notification for successful admission. If the CEIDs do not match, the entrance keeps locked and closed, and the employee receives a notification for denial.

Such an employee access authorization system provides security and convenience for employee access, especially when an employee approaches to an entrance to his department with his hands full. The employee does not have to try to free up his hands for keying in a password or swiping a card or tapping a card in order to unlock and open the door, as along as the mobile application described in the present invention is turned on, the entrance is unlocked and open automatically once the employee gets to the proximity of the entrance and his identification is verified by the system as described above.

User Case 4: Loyalty Identification Recognition

In one embodiment, the present invention is used for presenting loyalty identification and making payment at a retail store. For example, a grocery store has its mobile application and the location-based automated authorization function is incorporated into the grocery store mobile app. A BAS is set up with specific data requirements for recognizing loyalty identification and making payment. At least one point of sale (POS) station is calibrated to receive BLE signals and connected to the BAS in network communication. Customers in the store loyalty program download the store app to their mobile devices and enter all required information. For example, customer names, phone numbers, member identification numbers, bank account information, billing addresses, and other associated information. Changing Time Interval, Original Timestamp, UID, Unique Encryption Key are automatically generated and saved to corresponding loyalty system accounts.

A loyalty member turns on the store app on his mobile device. The store app generates a CEID using a secure algorithm and combines the CEID with the user's UID to generate an ETID. The ETID is packaged and broadcast via a BLE signal. The BLE signal is continuous, but the ETID changes based on the defined Changing Time Interval. As the loyalty member scans items in the cart at a POS station, the POS station starts to receive the BLE transmission. The mobile device is within range when a predetermined signal strength threshold is met. The POS station reads the BLE signal and translates it into the ETID. The POS station then sends the ETID to the BAS. The BAS receives the ETID and separates into the UID and CEID. The BAS looks up the loyalty system account using the UID separated from the received ETID. Parameters saved to the loyalty system account within the BAS, including Changing Time Interval, Original Timestamp, UID, and Unique Encryption Key, are used to synthesize a CEID with the same algorithm used by the store app. The BAS compares the synthesized CEID to the one received from the mobile device (via BLE and the point of sale station). If the CEIDs match, loyalty points and/or discounts are applied, the loyalty member's credit card or bank account is charged and a receipt is generated and sent to the loyalty member's store app automatically when the customer is ready to check out. If the CEIDs do not match, the customer is asked to provide other types of payment to check out.

Customers do not have to carry their credit cards and debit cards and membership cards and coupons and other physical payment mediums in a physical wallet when they shop in a store. A store app integrated with the location-based automatic authentication in the present invention enables a secure and convenient mobile payment for in-store shopping.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for location-based authentication, comprising:
   an application on a mobile device, a sensor, and a backend platform;
   wherein the application on the mobile device is operable to cause the mobile device to construct a Bluetooth Low Energy (BLE) signal through:
      constructing a changing identifier;
      combining the changing identifier with a unique identifier to form a transitory identifier; and
      packaging the transitory identifier into the BLE signal;
   wherein the mobile device is operable to transmit the BLE signal comprising the transitory identifier;
   wherein the sensor is operable to receive the BLE signal and transmit the transitory identifier comprised in the BLE signal to the backend platform;
   wherein the backend platform is operable to:
      extract the changing identifier and the unique identifier from the received transitory identifier;
      retrieve user identification parameters based on the unique identifier;
      construct a second changing identifier based on the user identification parameters; and
      validate a user identification by comparing the second changing identifier and the extracted changing identifier.

2. The system of claim 1, wherein the mobile device is further operable to increase or decrease a transmission rate for transmitting the BLE signal based on a determined idleness of the mobile device.

3. The system of claim 1, wherein the mobile device transmits the BLE signal comprising the transitory identifier at a rate of between about 7 Hz and about 13 Hz.

4. The system of claim 1, wherein the mobile device is further operable to automatically activate the BLE advertising mode upon detecting that a measured or approximated speed of the mobile device is above a threshold, that the mobile device is located within a vehicle, or that the mobile device is within a predetermined distance of the vehicle.

5. The system of claim 1, wherein a transmission rate of the BLE signal is dependent upon a Central Processing Unit (CPU) activity of the mobile device.

6. The system of claim 1, wherein a BLE connection is never established between the mobile device and the sensor and a BLE connection is never established between the mobile device and the backend platform.

7. The system of claim 1, wherein the mobile device utilizes a highest available transmission rate setting for BLE transmissions.

8. The system of claim 1, wherein the changing identifier is encrypted.

9. The system of claim 1, wherein the changing identifier is based on an original account timestamp, a changing time interval, and/or a current timestamp.

10. The system of claim 1, wherein the changing identifier changes based on a changing time interval.

11. A method for location-based authentication, comprising:
   an application on a mobile device causing the mobile device to construct a transitory identifier from a changing identifier and a unique identifier;
   the mobile device packaging the transitory identifier into a Bluetooth Low Energy (BLE) signal;
   the mobile device transmitting the BLE signal;
   a sensor receiving the BLE signal;
   the sensor communicating the transitory identifier comprised in the BLE signal to a backend platform via network communication;
   the backend platform receiving the transitory identifier;
   the backend platform extracting the changing identifier and the unique identifier from the received transitory identifier;
   the backend platform retrieving user identification parameters based on the unique identifier and constructing a second changing identifier; and
   the backend platform validating a user identification by comparing the second changing identifier and the extracted changing identifier.

12. The method of claim 11, further comprising the mobile device increasing or decreasing a transmission rate for transmitting the BLE signal based on a determined idleness of the mobile device.

13. The method of claim 11, wherein the mobile device transmits the BLE signal comprising the transitory identifier at a rate of between about 7 Hz and about 13 Hz.

14. The method of claim 11, wherein the changing identifier is encrypted.

15. The method of claim 11, wherein the changing identifier is based on an original account timestamp, a changing time interval, and/or a current timestamp.

16. The method of claim 11, wherein the changing identifier changes based on a changing time interval.

17. A system for location-based authentication, comprising:
   an application on a mobile device, a sensor, and a backend platform;
   wherein the mobile device is operable to transmit a Bluetooth Low Energy (BLE) signal comprising an encrypted transitory identifier;
   wherein the sensor is operable to receive the BLE signal from the mobile device and transmit the encrypted transitory identifier comprised in the BLE signal to the backend platform;
   wherein the backend platform is operable to extract a unique identifier and a changing encrypted identifier from the received encrypted transitory identifier, generate a second changing encrypted identifier based on user identification parameters associated with the extracted unique identifier, and validate a user identification by comparing the generated second changing encrypted identifier and the extracted changing encrypted identifier; and
   wherein the mobile device transmits the BLE signal comprising the encrypted transitory identifier at a rate of between about 7 Hz and about 13 Hz.

18. The system of claim 17, wherein the mobile device is further operable to increase or decrease a transmission rate for transmitting the BLE signal based on a determined idleness of the mobile device.

19. The system of claim 17, wherein the mobile device is further operable to automatically activate the BLE advertising mode upon detecting that a measured or approximated speed of the mobile device is above a threshold, that the mobile device is located within a vehicle, or that the mobile device is within a predetermined distance of the vehicle.

20. The system of claim 17, wherein a transmission rate of the BLE signal is dependent upon a Central Processing Unit (CPU) activity of the mobile device.

* * * * *